Feb. 1, 1966 R. G. SANDERS 3,231,978
GAUGE
Original Filed Jan. 29, 1962
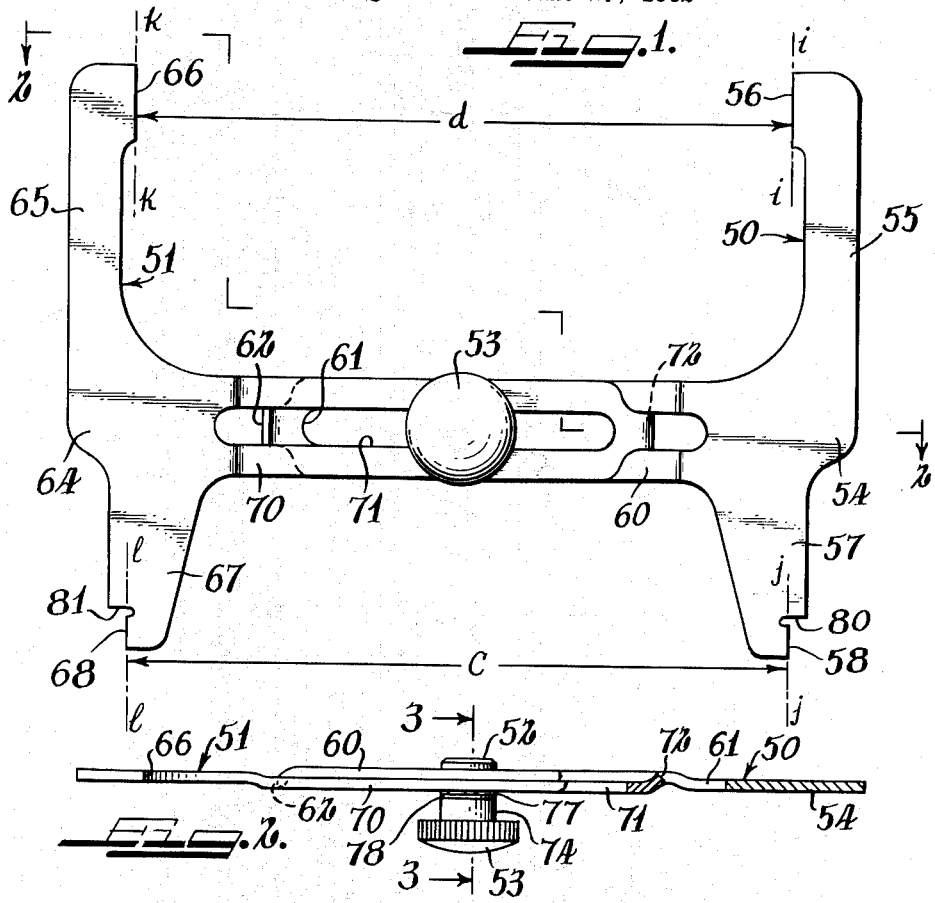
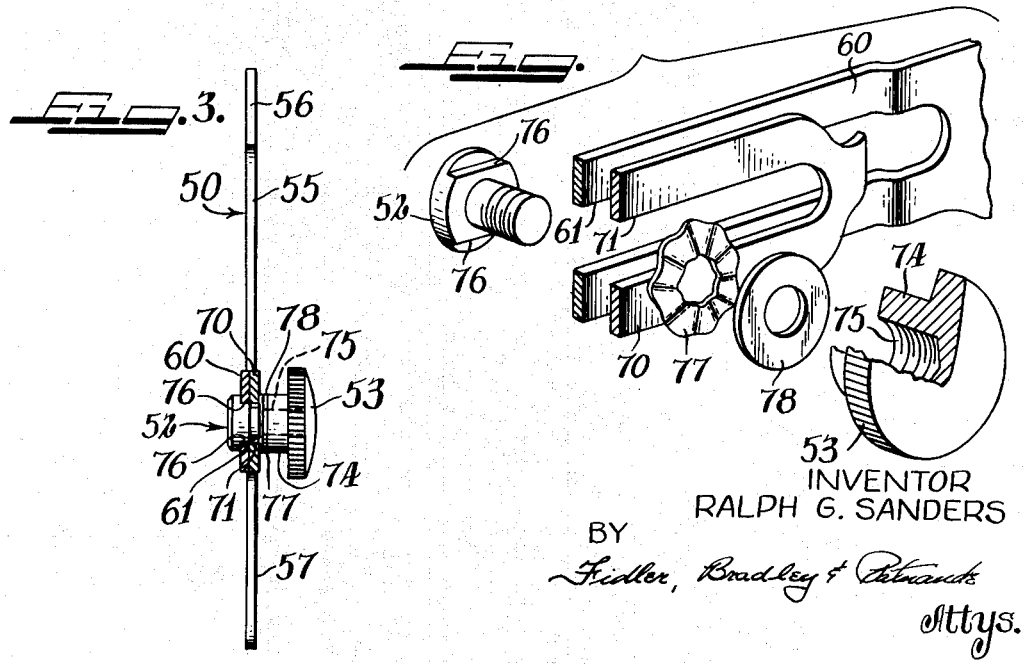
INVENTOR
RALPH G. SANDERS
BY
Fidler, Bradley & Patnaude
Attys.

United States Patent Office 3,231,978
Patented Feb. 1, 1966

3,231,978
GAUGE
Ralph G. Sanders, Lake Villa, Ill., assignor to Ammco Tools, Inc., Chicago, Ill., a corporation of Illinois
Continuation of application Ser. No. 169,545, Jan. 29, 1962. This application Dec. 11, 1962, Ser. No. 244,545
1 Claim. (Cl. 33—143)

This application is a continuation of application Serial No. 169,545 filed by me on January 29, 1962, which application has been abandoned.

This invention relates to gauges and, more particularly, to a novel transfer gauge which is capable of measuring an inside dimension and thereby producing a corresponding gauge setting for an outside dimension smaller than the inside dimension or of measuring an outside dimension and thereby producing a corresponding gauge setting for an inside dimension larger than the outside dimension.

The gauge of the present invention is particularly well adapted for setting brake shoes in relation to brake drums of vehicles, such as automotive vehicles, and for illustrative purposes it will be described in connection with such use. However, it will be understood that the gauge of my invention is not limited to such use, but is capable of other uses as well appear from the following description and accompanying drawings.

It is desirable that the brake shoes of a vehicle be normally spaced inwardly from the braking surface of the brake drum a predetermined amount which in automotive vehicles generally is in the neighborhood of 0.010″. If too little clearance is provided between the brake shoe and the brake drum, the brakes will drag and heat in use. On the other hand, if the clearance is too great, there will be a loss in "brake pedal"—that is to say, the brake pedal, when actuated by the driver, will be halted by abutment with the floorboard of the vehicle before the brakes have been fully applied. In this connection, this situation is even more acute on a fast stop because the brake drums in that case will expand and reduce "brake pedal." In normal brakes, the clearance between the shoes and the drum is small, for example, around 0.010″ and hence the setting of the brake shoes relative to the brake drum must be accurately effected.

Prior to my invention, it was the practice to adjust the brakes with the brake drum in place surrounding the brake shoes. In accordance with such practice, in order to adjust the brake shoes, the latter are expanded against the drum by the operator and "backed off" a predetermined amount (that is, the operator causes the shoes to be moved inwardly away from the brake drum a predetermined amount) to provide the desired clearance. This is effected by turning the adjusting member (or "star wheel"), which has a notched periphery, through a predetermined angular amount as indicated by the notches. Access to the star wheel can only be obtained through the back of the vehicle wheel, namely, through the backing plate and adjustment which is effected by inserting a tool through the back plate to turn the star wheel.

It is, of course, relatively easy for an operator to turn the star wheel a number of notches, but the difficulty arises from the fact that it is unlikely that any two operators will tighten the shoe against the drum to the same degree of tightness. Hence the starting point for the adjustment of the star wheel is not uniform with different operators; and even though each operator may back off the star wheel the correct number of notches, the clearance between the brake shoes and the drum will not necessarily be the same for all operators. Therefore, it is usually considered necessary to road test the vehicles and reset the star wheel to get the desired "brake pedal." This is, of course, time consuming and expensive.

According to the present invention, applicant provides a transfer gauge which is capable of being used to measure the diameter of the drum before the drum is assembled on the shoes. Such measurement is taken by adjusting the gauge in the drum so that the two outwardly facing gauging surfaces are caused to engage the braking surface of the drum. This gauging causes a corresponding movement of two inwardly facing opposed gauging surfaces to a distance apart corresponding to the setting of the outwardly facing surfaces. The inwardly facing surfaces are in opposition and parallel to the outwardly facing surfaces, but are spaced apart a predetermined distance equal to the spacing between the outwardly facing surface less twice the desired clearance. Thus the inwardly facing surfaces are spaced apart a distance equal to the desired brake shoe diameter.

An object of the present invention is to provide a novel transfer gauge which is capable of gauging an inside dimension and producing a corresponding movement of outside gauging surfaces or gauging an outside dimension and producing a corresponding movement of inside gauging surfaces.

Another object is to provide a transfer gauge which is capable of measuring an inside dimension and thereby producing a corresponding gauge setting for an outside dimension smaller than the inside dimension by a predetermined amount in all gauge settings or of measuring an outside dimension and thereby producing a corresponding gauge setting for an inside dimension larger than the outside dimension by a predetermined amount in all gauge settings.

A further object is to provide a transfer gauge having a first set of gauging surfaces adapted to measure a first dimension and thereby produce a setting of a second set of gauging surfaces corresponding to the setting of the first set of gauging surfaces but with the second set of gauging surfaces spaced apart in all gauge settings a predetermined distance less than said first set of gauging surfaces.

A further object is to provide a transfer gauge having a first set of gauging surfaces adapted to measure a first dimension and thereby produce a setting of a second set of gauging surfaces corresponding to the setting of the first set of gauging surfaces but with the second set of gauging surfaces spaced apart in all gauge settings a predetermined distance less than said first gauging surfaces and wherein said predetermined distance may be adjustably varied independently of the various gauge settings.

A further object is to provide a transfer gauge capable of gauging the inside diameter of a brake drum disassembled from the cooperating brake shoes and providing a corresponding setting of gauging surfaces for gauging the outside diameter of a pair of brake shoes so as to permit the shoes to be set to provide a predetermined clearance of the brake shoes within the drum when the shoes and drum are assembled.

A further object is to provide a transfer gauge for indicating the setting for a pair of brake shoes in accordance with the inside diameter of the corresponding brake drum to provide a predetermined clearance between the brake shoe surfaces and the braking surface of the brake drum.

Another object is to provide a transfer gauge which is simple and rugged in construction, inexpensive to manufacture and easy to use.

A further object is to provide a transfer gauge which is formed by a relatively small number of simple parts.

Another object ist to provide a transfer gauge which is comprised essentially of two gauging members of identical form.

A further object is to provide a transfer gauge which is comprised essentially of two gauging members which can be formed by a stamping operation.

A further object is to provide a transfer gauge comprising two gauging members having similar portions which interengage to guide such members for expanding and contracting movement.

A further object is to provide a transfer gauge including a pair of movable gauge members which are adapted to be locked together in gauging position by locking means and to be yieldably held against expanding or contracting movement when the locking means is released.

Other objects and advantages will appear from the following description taken in connection with the appended drawings, wherein:

FIGURE 1 is a side elevational view of a preferred embodiment of the invention;

FIG. 2 is a sectional view taken along line 2—2 of FIG. 1;

FIG. 3 is a view of a section taken along line 3—3 of FIG. 2, and

FIG. 4 is an exploded view of a portion of the device of FIG. 1.

Referring now to FIGS. 1 to 4 the gauge includes a first gauging member 50, a second gauging member 51, preferably identical with the member 50 and a headed lock screw 52 cooperating with a knob 53 securing the members 50 and 51 together. The gauging members 50 and 51 each are formed as essentially flat members, preferably from heavy sheet metal or plate metal hereinafter referred to generally as "sheet metal." They are so shaped that they may be formed readily by stamping.

The gauging member 50 has a body 54, an upstanding arm 55 with an outside gauging surface 56, and a depending arm 57 having an inside gauging surface 58. The body 54 also has an extension 60 formed with an elongated slot 61. The extension 60 has at its outer end an inturned tongue 62. The gauging member 51 is identical with gauging member 50 and is formed with a body 64 having an upstanding arm 65 with an outside gauging surface 66 and a depending arm 67 formed with an inside gauging surface 68. The body 64 has an extension 70 with a slot 71 and an inturned tongue 72.

A shoulder 80 is provided on the member 50 adjacent the inside gauging surface 58 and on the same edge. A similar shoulder 81 is provided on the member 51 adjacent the inside gauging surface 65 and on the same edge.

The two gauging members 50 and 51 are assembled with their extensions 60 and 70 in face-to-face engagement and with the tongue 62 entering the slot 71 and the tongue 72 entering the slot 61. Thus, the members are permitted to slide together and apart, but are prevented from turning relatively to each other. The headed screw 52 extends through slots 61 and 71 in the extensions 60 and 70 respectively and is threaded into a socket 75 formed in the shank 74 of the knob 53. The lock screw 52 is formed with flat 76 on its shank which cooperates with the slot 61 to prevent the screw from turning in the slot. A wave bend washer 77 and a plain washer 78 are disposed on the shank of the screw 52 and between the member 70 and the end of the shank 74.

The gauging surfaces 56 and 58 lie in parallel planes $i$—$i$ and $j$—$j$ and the gauging surfaces 66 and 68 lie in parallel planes $k$—$k$ and $l$—$l$ and all the planes are parallel to each other and preferably perpendicular to the center line of the extensions 60 and 70 connecting the two gauging members. The planes $i$—$i$ and $k$—$k$ of the surfaces 56 and 66 are spaced at such distances inwardly from the planes $j$—$j$ and $l$—$l$ respectively of the corresponding surfaces 58 and 68 that the dimension $d$ between the surfaces 56 and 66 is equal to the dimension $c$ between the surfaces 58 and 68 less twice the desired clearance between the inner and outer diameters to be gauged.

In using the gauge, the knob 53 is loosened to permit the gauging members to be adjustably moved in a direction to bring their extensions closer together or farther apart by sliding them relatively to each other.

The gauge is inserted in the brake drum (not shown) with the latter disassembled from the shoes and one or the other of the gauging surfaces, for example 58, is caused to abut one portion of the brake drum surface and the other surface 68 caused to engage the brake drum surface at a point diametrically opposite to the first point of engagement. The gauging members are then locked in place by turning the knob 53. The gauging surfaces 58 and 68 are thereby held at a distance indicated by the line $c$ in FIG. 1 which corresponds to the diameter of the brake drum surface. This setting of the gauge brings the gauging surfaces 56 and 66 into positions spaced apart a distance indicated as $d$ in FIG. 1. This distance is equal to the brake drum diameter minus twice the clearance desired. The gauge is then applied to the brake shoes with the gauge surfaces 56 and 66 in position to be engaged by diametrically opposite points on the brake shoes and the brake shoes are adjusted to engage the gauging surfaces. The brake shoes thus are adjusted to a diameter which is equal to the drum diameter less twice the clearance desired, thereby providing a diameter of the brake shoes such that when the brake drum is assembled with the brake shoes the desired clearance is provided.

As will be seen from FIG. 1, the shoulders 80 and 81 are located at corresponding positions on their respective gauging members 50 and 51. Hence, when the gauge is inserted in a brake drum the shoulders engage the edge of the brake drum and serve as stops to limit the extent of entry of the gauge into the brake drum. Thus, the gauging surfaces 58 and 68 will engage opposite portions of the interior of the brake drum.

The two gauging members 50 and 51 are frictionally held against relative movement even when the knob 53 is loosened on the feed lock screw 52. This results from the use of the wave bend washer 77 between the gauging member 70 and the plain washer 78. The latter washer is provided to permit easy turning of the knob 53 relative to the feed lock screw.

From the foregoing it will be seen that the present invention provides a transfer gauge which is especially well suited for gauging the setting of brake shoes. The gauge is simple in construction and inexpensive to manufacture and is strong and rugged. By the use of the gauge of this invention the brake drum may be gauged and the corresponding shoes set before the drum is assembled on the shoes thereby providing easier access to the drum and shoes. Furthermore, by the use of the gauge of the present invention, the operation of setting brake shoes to the desired clearance relative to the corresponding brake drum is simpler, faster and more accurate than the operation as performed prior to this invention.

It will be understood that the gauge also can be used to gauge an outside dimension first and then set an inside dimension to a value which is equal to the inside dimension plus twice the clearance desired. This is accomplished by setting the gauging members in a position wherein the outside gauging surfaces engage the outside surfaces whose distance is to be gauged. The gauging members are then locked in this position and the gauge can then be used to set the inside surfaces at the corresponding distance.

This application discloses but does not claim certain subject matter disclosed and claimed in the co-pending application of Walter P. Kushmuk, Serial No. 134,244, filed August 28, 1961, now abandoned, which application is owned by the same assignee as the present application.

I claim:

A transfer gauge for adjusting the clearance between a set of brake shoes and an associated brake drum to a predetermined value, comprising a pair of substantially identical substantially flat gauging members, each having a gauging portion formed on opposite edges of its end portions respectively with an inside gauging surface for engagement with an inside surface and an outside gauging surface facing in the opposite direction from said inside gauging surface for engagement with an outside surface and an extension projecting from said gauging portion intermediate its ends and in face-to-face relation with the other extension, said gauging surfaces being fixedly disposed on each said gauging member and lying in parallel planes spaced apart by a distance equal to one-half said predetermined value of clearance, each extension being formed with a tongue and with an elongate slot receiving the tongue on the other extension to guide said gauging members for relative adjusting movement between extended and contracted positions with said inside gauging sufaces in alignment on a first line parallel to and on one side of said extensions and said outside gauging surfaces in alignment on a second line parallel to and on the other side of said extensions, said extensions being offset from said gauging portions whereby said gauging portions lie substantially in the same plane, and means for releasably retaining said gauging members in adjusted position, each said gauging member having a shoulder adjacent said inside gauging surface and between said inside gauging surface and said extension.

References Cited by the Examiner

UNITED STATES PATENTS

| | | | |
|---|---|---|---|
| 85,430 | 12/1868 | Burrows | 33—143 |
| 364,913 | 6/1887 | Emery | 33—164 |
| 563,089 | 6/1896 | Strange | 33—143 X |
| 929,477 | 7/1909 | Pappano | 33—106 |
| 1,810,427 | 6/1931 | Kissendorfer | 33—143 |
| 1,871,178 | 8/1932 | Hudson | 33—189 |
| 2,769,241 | 11/1956 | Barrett | 33—147 |
| 2,791,032 | 5/1957 | Barrett | 33—143 |
| 2,791,837 | 5/1957 | Denslinger | 33—41 |
| 3,026,624 | 3/1962 | Clay | 33—191 |

ISAAC LISANN, *Primary Examiner.*